United States Patent
Vandonkelaar

(10) Patent No.: US 10,717,001 B2
(45) Date of Patent: Jul. 21, 2020

(54) SYSTEM AND METHOD FOR SAVING TRACKED DATA IN THE GAME SERVER FOR REPLAY, REVIEW AND TRAINING

(71) Applicant: Zero Latency PTY LTD, North Melbourne (AU)

(72) Inventor: Scott Vandonkelaar, Alphington (AU)

(73) Assignee: ZERO LATENCY PTY LTD, North Melbourne (AU)

(*) Notice: Subject to any disclaimer, the term of this patent is extended or adjusted under 35 U.S.C. 154(b) by 0 days.

(21) Appl. No.: 15/658,331

(22) Filed: Jul. 24, 2017

(65) Prior Publication Data

US 2017/0319956 A1    Nov. 9, 2017

Related U.S. Application Data

(63) Continuation-in-part of application No. 15/081,711, filed on Mar. 25, 2016, now Pat. No. 9,916,496.
(Continued)

(51) Int. Cl.
*A63F 9/00* (2006.01)
*A63F 13/352* (2014.01)
(Continued)

(52) U.S. Cl.
CPC .......... *A63F 13/352* (2014.09); *A63F 13/212* (2014.09); *A63F 13/213* (2014.09);
(Continued)

(58) Field of Classification Search
None
See application file for complete search history.

(56) References Cited

U.S. PATENT DOCUMENTS 5,490,239 A   2/1996 Myers
5,509,810 A   4/1996 Schertz et al.
(Continued)

FOREIGN PATENT DOCUMENTS

CN   101859439 A   10/2010
EP   1368788 B1    12/2010
(Continued)

OTHER PUBLICATIONS

International Search Report and Written Opinion for PCT/US2016/000374 dated Nov. 15, 2016, 10 pages.
(Continued)

*Primary Examiner* — Seng H Lim
(74) *Attorney, Agent, or Firm* — Jennifer Hayes; Nixon Peabody LLP

(57) ABSTRACT

A system and method for replaying the activity on request to individuals and to the group at large within a virtual reality (VR) arena for training and efficiency improvement purposes from within the VR system or outside is disclosed. The virtual reality (VR) system does real time tracking and response feedback to the players, using light markers and cameras connected to multiple slave-server systems that are controlled by a master-server. The hierarchical data collection system collects all the activity and tracking data from the arena. The master-server combines and correlates all the data collected from the VR arena and sends that to the game-server to be saved in a dedicated storage memory coupled to the game server. This data is then played back as VR play back on request to individuals or to all players and supervisory staff within or outside the VR arena for training and efficiency improvement purposes.

28 Claims, 10 Drawing Sheets

Related U.S. Application Data

(60) Provisional application No. 62/513,319, filed on Jun. 5, 2017.

(51) Int. Cl.

| | | |
|---|---|---|
| *A63F 13/213* | (2014.01) | |
| *A63F 13/212* | (2014.01) | |
| *A63F 13/5258* | (2014.01) | |
| *G06K 9/00* | (2006.01) | |
| *G06K 9/46* | (2006.01) | |
| *A63F 13/31* | (2014.01) | |
| *G06F 3/01* | (2006.01) | |
| *A63F 13/22* | (2014.01) | |
| *G06K 9/32* | (2006.01) | |
| *G06F 3/03* | (2006.01) | |
| *A63F 13/35* | (2014.01) | |
| *A63F 13/497* | (2014.01) | |
| *A63F 13/5255* | (2014.01) | |
| *H04N 5/247* | (2006.01) | |
| *H04N 5/225* | (2006.01) | |
| *H04N 7/18* | (2006.01) | |
| *H04N 9/04* | (2006.01) | |

(52) U.S. Cl.
CPC ............. *A63F 13/22* (2014.09); *A63F 13/31* (2014.09); *A63F 13/35* (2014.09); *A63F 13/497* (2014.09); *A63F 13/5255* (2014.09); *A63F 13/5258* (2014.09); *G06F 3/011* (2013.01); *G06F 3/012* (2013.01); *G06F 3/0304* (2013.01); *G06K 9/00342* (2013.01); *G06K 9/00973* (2013.01); *G06K 9/3241* (2013.01); *G06K 9/4652* (2013.01); *H04N 5/2257* (2013.01); *H04N 5/247* (2013.01); *A63F 2300/8082* (2013.01); *H04N 7/181* (2013.01); *H04N 9/04* (2013.01)

(56) References Cited

U.S. PATENT DOCUMENTS

| | | | |
|---|---|---|---|
| 5,717,414 A | 2/1998 | Bergsneider et al. | |
| 5,751,289 A | 5/1998 | Myers | |
| 5,997,439 A | 12/1999 | Oshuga et al. | |
| 6,801,637 B2 | 10/2004 | Voronka et al. | |
| 6,950,123 B2 | 9/2005 | Martins | |
| 6,972,787 B1 | 12/2005 | Allen et al. | |
| 7,046,214 B2 | 5/2006 | Ebersole et al. | |
| 7,071,898 B2 | 7/2006 | Hobgood et al. | |
| 7,139,767 B1* | 11/2006 | Taylor | G06F 17/30244 |
| 7,225,548 B2 | 6/2007 | Sieracki et al. | |
| 7,262,747 B2 | 8/2007 | Ebersole et al. | |
| 7,479,967 B2 | 1/2009 | Bachelder et al. | |
| 7,639,233 B2 | 12/2009 | Marks | |
| 7,808,524 B2 | 10/2010 | Park et al. | |
| 7,918,808 B2 | 4/2011 | Simmons | |
| 8,115,814 B2 | 2/2012 | Iwase et al. | |
| 8,131,015 B2 | 3/2012 | Hildreth et al. | |
| 8,537,113 B2 | 9/2013 | Weising et al. | |
| 8,655,020 B2 | 2/2014 | Saptharishi et al. | |
| 8,698,875 B2 | 4/2014 | Anguelov et al. | |
| 8,705,799 B2 | 4/2014 | White et al. | |
| 8,818,420 B2 | 8/2014 | Schatzberg et al. | |
| 8,825,187 B1* | 9/2014 | Hamrick | H04S 7/304 |
| | | | 700/94 |
| 8,920,172 B1* | 12/2014 | Wilmink | F41G 3/26 |
| | | | 434/19 |
| 8,971,574 B2 | 3/2015 | Ye et al. | |
| 8,988,343 B2 | 3/2015 | Fei et al. | |
| 8,988,508 B2 | 3/2015 | Yahav et al. | |
| 9,068,843 B1 | 6/2015 | Sohn | |
| 9,147,260 B2 | 9/2015 | Hampapur et al. | |
| 9,159,152 B1* | 10/2015 | Glover | G06T 13/40 |
| 9,215,262 B2 | 12/2015 | Oyman | |
| 9,221,506 B1 | 12/2015 | Georgeson et al. | |
| 9,223,786 B1* | 12/2015 | Hamrick | G06F 17/30056 |
| 9,311,742 B1* | 4/2016 | Glover | G06T 15/08 |
| 9,443,352 B1* | 9/2016 | Glover | G06T 19/003 |
| 10,071,306 B2 | 9/2018 | Vandonkelaar | |
| 2003/0120183 A1 | 6/2003 | Simmons | |
| 2004/0063481 A1 | 4/2004 | Wang | |
| 2004/0104935 A1 | 6/2004 | Williamson et al. | |
| 2004/0155962 A1* | 8/2004 | Marks | G06T 7/248 |
| | | | 348/169 |
| 2005/0168486 A1 | 8/2005 | Sato | |
| 2005/0272517 A1* | 12/2005 | Funk | A63B 15/00 |
| | | | 473/222 |
| 2006/0055706 A1 | 3/2006 | Perlman | |
| 2006/0247070 A1 | 11/2006 | Funk et al. | |
| 2007/0132785 A1 | 6/2007 | Ebersole et al. | |
| 2007/0242886 A1 | 10/2007 | St John | |
| 2009/0040308 A1 | 2/2009 | Temovskiy | |
| 2009/0187389 A1 | 7/2009 | Dobbins et al. | |
| 2009/0209343 A1 | 8/2009 | Foxlin et al. | |
| 2009/0278917 A1 | 11/2009 | Dobbins et al. | |
| 2010/0075284 A1 | 3/2010 | Kozhevnikov et al. | |
| 2010/0166260 A1 | 7/2010 | Huang et al. | |
| 2010/0188401 A1 | 7/2010 | Gordon et al. | |
| 2010/0210377 A1 | 8/2010 | Lock | |
| 2012/0086728 A1 | 4/2012 | McArdle et al. | |
| 2012/0142415 A1 | 6/2012 | Lindsay | |
| 2012/0262558 A1* | 10/2012 | Boger | G02B 27/0093 |
| | | | 348/61 |
| 2012/0321173 A1* | 12/2012 | Mitarai | G01B 11/03 |
| | | | 382/154 |
| 2012/0327194 A1* | 12/2012 | Shiratori | G06K 9/00342 |
| | | | 348/47 |
| 2013/0063432 A1 | 3/2013 | Kaps et al. | |
| 2013/0064427 A1 | 3/2013 | Picard et al. | |
| 2013/0076616 A1 | 3/2013 | Csaszar et al. | |
| 2013/0190086 A1 | 7/2013 | Maison et al. | |
| 2014/0272837 A1 | 9/2014 | Becker et al. | |
| 2015/0088863 A1 | 3/2015 | Horiba | |
| 2015/0097719 A1 | 4/2015 | Balachandreswaran et al. | |
| 2015/0116316 A1 | 4/2015 | Fitzgerald et al. | |
| 2015/0124084 A1* | 5/2015 | Ikenoue | A63F 13/06 |
| | | | 348/135 |
| 2015/0149104 A1 | 5/2015 | Baker et al. | |
| 2015/0193949 A1 | 7/2015 | Katz et al. | |
| 2015/0193979 A1 | 7/2015 | Grek | |
| 2015/0193983 A1 | 7/2015 | Katz et al. | |
| 2015/0208058 A1 | 7/2015 | Denziot et al. | |
| 2015/0260474 A1 | 9/2015 | Rublowsky et al. | |
| 2015/0286275 A1 | 10/2015 | Huang et al. | |
| 2015/0302648 A1 | 10/2015 | Zhang | |
| 2016/0026253 A1 | 1/2016 | Bradski et al. | |
| 2016/0027213 A1 | 1/2016 | Burns et al. | |
| 2016/0027220 A1 | 1/2016 | Jimenez | |
| 2016/0041391 A1 | 2/2016 | Van Curen et al. | |
| 2016/0049085 A1 | 2/2016 | Beeson | |
| 2016/0054837 A1 | 2/2016 | Stafford | |
| 2016/0063731 A1 | 3/2016 | Yamamoto et al. | |
| 2016/0124502 A1 | 5/2016 | Sawyer et al. | |
| 2016/0225156 A1* | 8/2016 | Ikenoue | G06K 9/00342 |
| 2016/0232715 A1 | 8/2016 | Lee | |
| 2016/0257000 A1 | 9/2016 | Guerin et al. | |
| 2016/0364219 A9 | 12/2016 | Higgins | |
| 2016/0364910 A1 | 12/2016 | Higgins | |
| 2017/0039881 A1 | 2/2017 | Belch et al. | |
| 2017/0274271 A1 | 9/2017 | Vandonkelaar | |
| 2017/0274275 A1 | 9/2017 | Vandonkelaar | |
| 2017/0274277 A1 | 9/2017 | Vandonkelaar | |
| 2017/0277940 A1 | 9/2017 | Vandonkelaar | |
| 2017/0289221 A1 | 10/2017 | Khalid et al. | |
| 2018/0043247 A1 | 2/2018 | Vandonkelaar | |
| 2018/0150686 A1 | 5/2018 | Vandonkelaar | |

FOREIGN PATENT DOCUMENTS

| | | |
|---|---|---|
| WO | 2006103662 A2 | 10/2006 |
| WO | 2015048890 A1 | 4/2015 |

(56) References Cited

FOREIGN PATENT DOCUMENTS

| WO | 2015123771 A1 | 8/2015 |
|---|---|---|
| WO | 2015123774 A1 | 8/2015 |
| WO | 2018/002698 A1 | 1/2018 |
| WO | 2018/029515 A1 | 2/2018 |
| WO | 2018/037269 A1 | 3/2018 |

OTHER PUBLICATIONS

International Search Report and Written Opinion for PCT/IB2016/000381 dated Dec. 23, 2016, 15 pages.

International Search Report and Written Opinion for PCT/IB2016/057844 dated Feb. 22, 2017, 15 pages.

International Search Report and Written Opinion for PCT/IB2016/057845 dated Mar. 6, 2017, 10 pages.

Arar et al., Estimating Fusion Weights of a Multi-Camera Eye Tracking System by Leveraging User Calibration Data, Proceedings of the Ninth Biennial ACM Symposium on Eye Tracking Research and Applications, 2016, pp. 225-228.

Ehrl et al., A Reliability Measure for Merging Data from Multiple Cameras in Optical Motion Correction, Proc. ISMRM Scientific Workshop—Motion Correction in MRI, 2014, 1 page.

Guerra-Filhol, Optical Motion Capture: Theory and Implementation, Journal of Theoretical and Applied Informatics (RITA), 2005, vol. 12(2), pp. 1-29.

Mannberg et al., High Precision Real-Time 3D Tracking Using Cameras, Infotech at Aerospace, American Institute of Aeronautics and Astronautics, 2011, pp. 1-11.

Vasylevska et al., Influence of Vertical Navigation Metaphors and Presence, Proceedings of the International Society for Presence Research, 2014, pp. 205-212.

International Search Report and Written Opinion for PCT/IB2017/054513 dated Oct. 13, 2017, 12 pages.

Li, Y., Development of Immersive and Interactive Virtual Reality Environment for Two-Player Table Tennis, Diss. University of Central Lancashire, 2012, pp. 96-99.

International Preliminary Report on Patentability for PCT/IB2016/000374 dated Sep. 28, 2018, 8 pages.

International Preliminary Report on Patentability for PCT/IB2016/057842 dated Jan. 1, 2019, 6 pages.

International Preliminary Report on Patentability for PCT/IB2016/057844 dated Feb. 12, 2019, 9 pages.

International Preliminary Report on Patentability for PCT/IB2016/057845 dated Feb. 26, 2019, 7 pages.

\* cited by examiner

Camera and Server Synchronization Process

S402 — Locate tracking markers in the game space using cameras communicating with the slave servers.

S404 — Transmit positions of the tracking markers to the master server.

S406 — At the master server, create a list of all intersection points where a position of a first marker seen by one camera matches a position of a second marker seen by another camera

S408 — For each intersection point, averaging the positions of the first and second markers to create a processed position for the intersection point that represents a position of a composite tracking marker corresponding to both the first and second markers.

FIG. 4

SYSTEM AND METHOD FOR SAVING TRACKED DATA IN THE GAME SERVER FOR REPLAY, REVIEW AND TRAINING

CROSS-REFERENCE TO RELATED APPLICATIONS

This application is a continuation-in-part application of U.S. application. Ser. No. 15/081,711, entitled "System and Method for Operating a Virtual Reality Environment Using Colored Marker Lights Attached to Game Objects," filed on Mar. 25, 2016, the entirety of which is hereby incorporated by reference.

This application also claims priority to U.S. provisional patent application No. 62/515,319, entitled "System and Method for Saving Tracked Data in the Game Server for Reply, Review and Training," filed Jun. 5, 2017, the entirety of which is hereby incorporated by reference.

BACKGROUND

Field

This invention relates to the field of virtual reality (VR) or augmented reality (AR) and, in particular to systems and methods which track object locations and activity using colored tracking marker lights and multiple color cameras, where in the tracked activity can be saved and replayed for review and training.

Related Art

Virtual reality (VR) and Augmented reality (AR) are currently improving by leaps and bounds. The virtual reality and augmented reality ideas have long been considered the best tools for training individuals especially where the actual training sites are not available or accessible.

The problem is also the lack of tools that can present a realistic practice training background at a cost that is reasonable. Though virtual reality systems have been adopted for use in training, for flight simulators, hazardous duty simulations, medic training, and vehicle simulation. The advantage of virtual reality for high-risk service providers is that interactive scenarios can be experienced without any personal danger and at lower cost than other types of simulation. Virtual reality practice training is conducted in which personnel are given virtual reality glasses using head-mounted displays (HMD) which are worn to create a three-dimensional visual illusion of seeing a particular-place or field of action which can be simultaneously viewed by a group of participants.

Augmented reality may consist of projecting additional information on a real-world scene by combining computer-generated graphics with what a person perceives by eye. An example of such AV is Google Glass, which is a wearable computer with an optical head-mounted display (OHMD) developed by Google. Google Glass communicates by Bluetooth with a smartphone to display information or take movies or pictures which are shown as images projected in front of the wearer. Such a scene provides a realistic practice training or teaching capability without the individuals being put into real time, possibly hazardous situations.

Conventional virtual reality systems which allow free-roaming for players use infrared tracking to determine the positions of players and other objects. Such systems are relatively expensive. Alternatively, a tracking system using colored marker lights has advantages in the ability to differentiate players and objects, however accurately tracking markers over a relatively broad space or other virtual reality environment is difficult without using a plurality of cameras.

Using a plurality of cameras presents a challenge with respect to position calibration, coordination, and synchronization. Also, issues related to colored tracking markers conflicting with each other as players roam about a space used for virtual reality environment also present a challenge as markers with the same color may come within a close proximity to one another.

As discussed above what has also been missing is the capability to provide a cost-effective scheme for VA and VR training implementation with a capability to use replay and review of actions that happen within the VR or AR training and practice arena.

SUMMARY

Embodiments of the invention are directed to a replay capability that provides feedback to the trainee on his actions and their result, for improving the training experience and if needed changing his reactions to the actions in future. This improves the capability of the training VR/AR system to not only provide a simulated environment for training, but also to change and improve trainee response by providing active feedback as a teaching tool.

In accordance with one aspect of the invention, a system for replay of activities in a virtual reality arena is disclosed that includes a master server; a game server communicatively coupled to the master server; one or more cameras communicatively coupled to the master server, the one or more cameras to observe a plurality of tracking markers associated with individual participants and equipment within a virtual reality arena that enable the maser server to track activities of individual participants in the virtual reality arena; wherein the master server compiles and processes the tracked activity information from the virtual reality arena to determine a position and activity of the individual participants and equipment within the virtual reality arena; wherein the master server provides the position and activity data to the game server; a storage system coupled to the game server for storing the position and activity data received from the master server; wherein the game server communicates through wireless communication links with the individual participants to provide feedback information on the position and activity data within the virtual reality arena to the individual participants within the virtual reality arena; wherein the game server is configured to retrieve and play back a segment of the stored position and activity data that relate to a time period just prior to an individual becoming inactive within the virtual reality arena through the wireless communication link of the inactive individual participant in response to receiving a request from within the virtual reality arena from the temporarily inactive individual participant.

The system may further include a backpack personal computer electronically coupled to at least one of a head-mounted device, controller or simulated weapon device carried by the player.

The tracking markers may be selected from the group consisting of light sources and radiation sources. The tracking markers may be selected from the group consisting of fluorescent light sources and infrared bulbs. Each of the plurality of tracking markers may be configured to display multiple colors.

The system may further include a plurality of slave tracking servers in communication with and controlled by the master server, each of the plurality of slave tracking servers coupled with one or more cameras. The plurality of slave tracking servers may determine the positions and movements of game objects, and wherein the positions and movements of the game objects are consolidated in the master server. The plurality of slave tracking servers may process images received from the one or more cameras to identify tracking markers in optical data associated with the images.

The play back may be for activity review by the requesting temporarily inactive individual participant only, while the individual participant is in the inactive state and while the activity in the at least a virtual reality arena is continuing. The play back may be for training.

In accordance with another aspect of the invention, a system for replaying activities in a virtual reality arena is disclosed that includes a master server; a game server communicatively coupled to the master server; one or more cameras communicatively coupled to the master server, the one or more cameras to observe a plurality of tracking markers associated with individual participants and equipment within at least a virtual reality arena that enable the maser server to track the activities of the individual participants in the at least a virtual reality arena; wherein the master server compiles and processes the tracked activity information from the at least a virtual reality arena to determine position and activity of individual participants and equipment within the at least a virtual reality arena; wherein the master server provides the position and activity data to the game server; a storage system coupled to the game server for storing the position and activity data received from the master server; wherein the game server communicates through wireless communication links with the individual participants to provide feedback information on the position and activity data within the virtual reality arena to the individual participants within the virtual reality arena; wherein the game server is configured to retrieve and play back the stored position and activity data for a requested time period in response to receiving a request from an authorized individual during an inactive state.

The authorized individual may be within the virtual reality arena. The authorized individual may be outside the virtual reality arena.

The stored position and activity data may be played back through the wireless communication link of the individual participants. The stored position and activity data may be played back through a communication link to the authorized individual.

The inactive state may be a temporary break in activity in the at least a virtual reality environment. The inactive state may be completion of activity in the virtual reality environment.

The replay may be available to all individual participants in the virtual reality environment. The replay may be available outside the virtual reality environment.

In accordance with a further aspect of the invention, a system is disclosed that includes a processor; a memory coupled to the processor, the memory containing machine readable medium comprising machine executable code having stored thereon instructions for operating the system, wherein the system is configured to execute the machine executable code to cause the system to identify objects and participants in a virtual reality environment; collect position and activity data for the identified objects and participants; transmit collected activity data to a master tracking server; receive a replay request; extract data responsive to the replay request, the data including the position and activity data collected for the identified objects and participants; and transmit the data corresponding to the replay request.

The replay request may be received from at least one of the participants in the virtual reality environment, and wherein the data corresponding to the replay request is transmitted to the at least one of the participants that requested the replay.

The replay request may be received from an administrator of the virtual reality environment, and wherein the data corresponding to the replay request is transmitted to all participants in the virtual reality environment.

In accordance with yet another aspect of the invention, a computerized method is disclosed that includes identifying objects and participants in a virtual reality environment; collecting position and activity data for the identified objects and participants; transmitting collected position and activity data to a master tracking server; extracting consolidated position and activity data by the master server; sending the consolidated position and activity data to a game server; storing the position and activity data in memory; receiving a replay request; extracting data responsive to the replay request, the data including the position and activity data collected for the identified objects and participants from the memory; and transmitting the data corresponding to the replay request.

The replay request may be received from at least one of the participants in the virtual reality environment, and wherein the data corresponding to the replay request is transmitted to the at least one of the participants that requested the replay.

The replay request may be received from an administrator of the virtual reality environment, and wherein the data corresponding to the replay request is transmitted to all participants in the virtual reality environment.

BRIEF DESCRIPTION OF FIGURES

The accompanying drawings, which are incorporated into and constitute a part of this specification, illustrate one or more examples of embodiments and, together with the description of example embodiments, serve to explain the principles and implementations of the embodiments.

FIG. 4 depicts a flowchart for synchronizing a plurality of cameras with consistent and accurate location of game objects in accordance with one embodiment of the invention.

DETAILED DESCRIPTION

Figure 1:
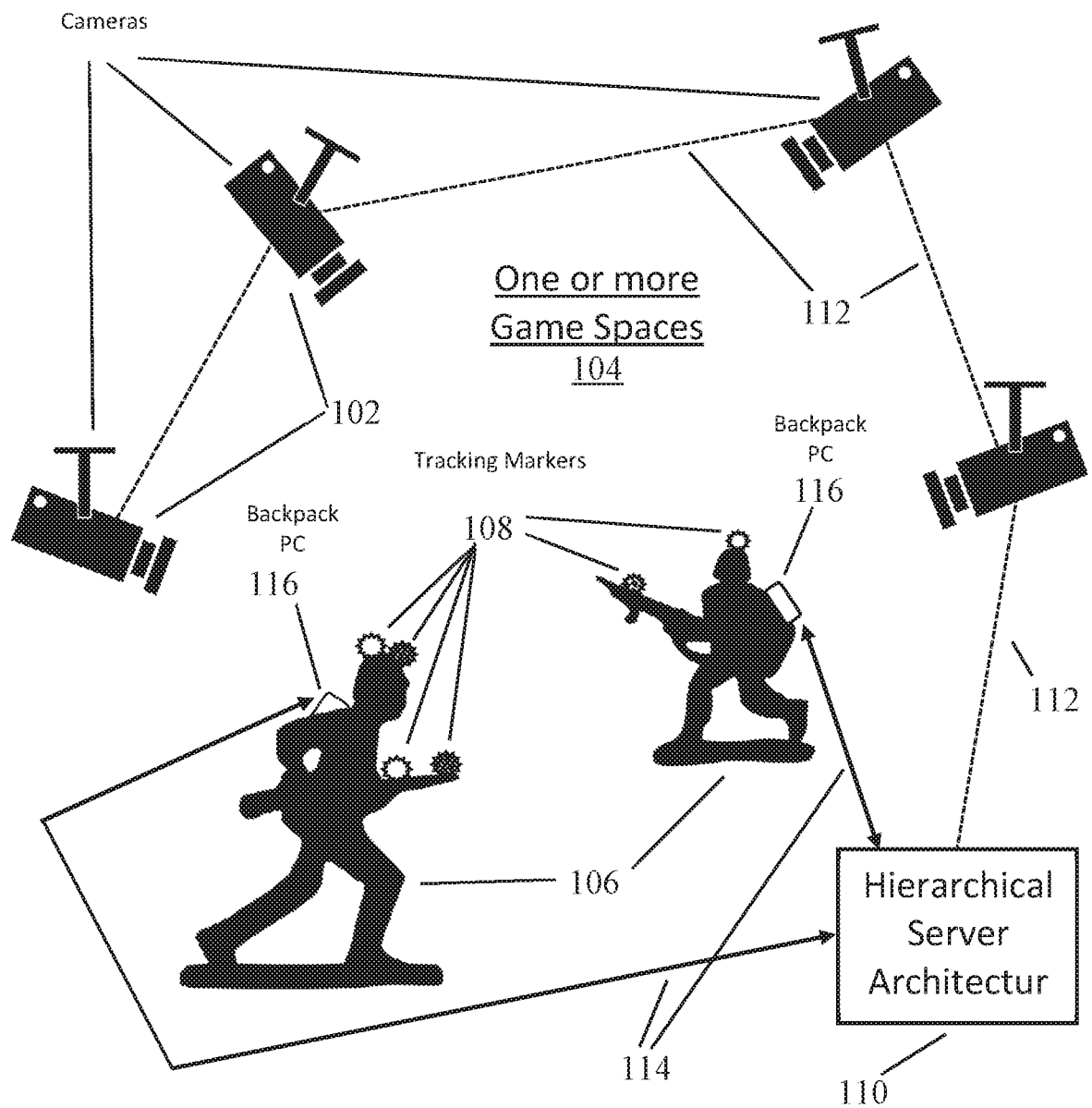
FIG. 1 depicts a system comprising a plurality of cameras which track objects such as players and controllers with tracking markers attached thereto in accordance with one embodiment of the invention.

A system and method for replaying the activity on request to individuals and to the group at large within a virtual reality (VR) arena for training and efficiency improvement purposes from within the VR system or outside is disclosed. The virtual reality (VR) system does real time tracking and response feedback to the participants, within the arena using light markers and cameras connected to multiple slave-server systems, that are controlled by a master-server. The hierarchical data collection system collects all the activity and tracking data from the arena. The master-server combines and correlates all the data collected from the VR arena and sends that to the game-server to be saved in a dedicated storage memory coupled to the game server. This data is then played back as VR play back on request to individuals or to all players and supervisory staff within or outside the VR arena for review of activity, training and efficiency improvement purposes. It is possible to selectively replay the saved data for the total time period of the activity or for any specified time segments once the activity in the arena has been completed.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Systems and methods are disclosed for operating a system for a virtual reality environment where colored marker lights are attached to objects for tracking of positions and activity within the VR/AR arena.

The objects may include players, controllers, and devices related to the game or another virtual reality experience.

One or more color cameras are used to view one or more spaces, and track positions and orientations of players and other objects according to the attached marker lights. A hierarchical system of servers is used to process positions and orientations of objects and provide controls as necessary for the system. A method for color assignment is described as well as a calibration process, and a dynamic optimization process. A synchronization process is also described that ensures that a plurality of cameras and attached servers are properly coordinated. Head-mounted devices may also be used in conjunction with marker lights to provide information regarding players.

FIG. 1 depicts a system comprising a plurality of cameras which track objects such as players and controllers with tracking markers attached thereto, according to an exemplary embodiment. For instance, pictured in FIG. 1 is a plurality of color cameras 102 viewing one or more spaces 104 of a virtual reality. A plurality of spaces or other virtual reality environments in the same physical space are supported by a logical or virtual division of the physical space into a plurality of virtual spaces where a single game may be operated in one of the plurality of virtual spaces or other virtual reality environments. Cameras 102 or other optical detectors suitable of detecting radiation from tracking markers 108, including infrared detectors, RGB cameras, hyperspectral sensors, and others.

The space/spaces being viewed by the camera, as described above and hereafter throughout the specification may include any kind of space used by a user/player to participate in the virtual reality experience, the virtual reality experience comprising a virtual reality game or any other form of virtual reality experience.

Typically, at least two cameras 102 are utilized to observe the one or more spaces 104 or other virtual reality environments, however the limit to the number of cameras 102 is not limited thereto and only a single camera or more than two cameras may be utilized to observe the one or more spaces 103. Cameras 102 may be connected to a hierarchical server architecture 110 which analyzes images viewed by cameras 102 and communicates with players 106 and other objects such as game controllers, simulated weapons etc., all of which include tracking markers 108 for observation by cameras 102. The hierarchical server architecture 110 will be described in more detail below, with reference to FIG. 3 and FIG. 4.

Connections 112 between cameras 102 and server architecture 110 may be either hardwired such as Ethernet, or alternately wirelessly connected such as, for example, Wi-Fi connectivity. However, the form of connection 112 is not limited thereto and other forms of establishing a network may be used. Communication between server architecture 110 and players 106 and other game objects for both control and sensing purposes may be performed through wireless connectivity 114 which may include Wi-Fi connectivity or other forms of wireless connectivity.

According to another embodiment, communication between the server architecture 110 and players 106 may be performed through a wired connection. For some embodiments of the invention, players 106 may carry a form of backpack PC 116 which may interface electronically with a form of head-mounted device and/or a controller or simulated weapon device carried by the player. Alternately, backpack PC 116 may communicate wirelessly and directly with the head-mounted device and or the controller or simulated weapon device carried by the player, however this form of communication is not limited thereto and the communication may be performed via a wired connection.

Figure 2:
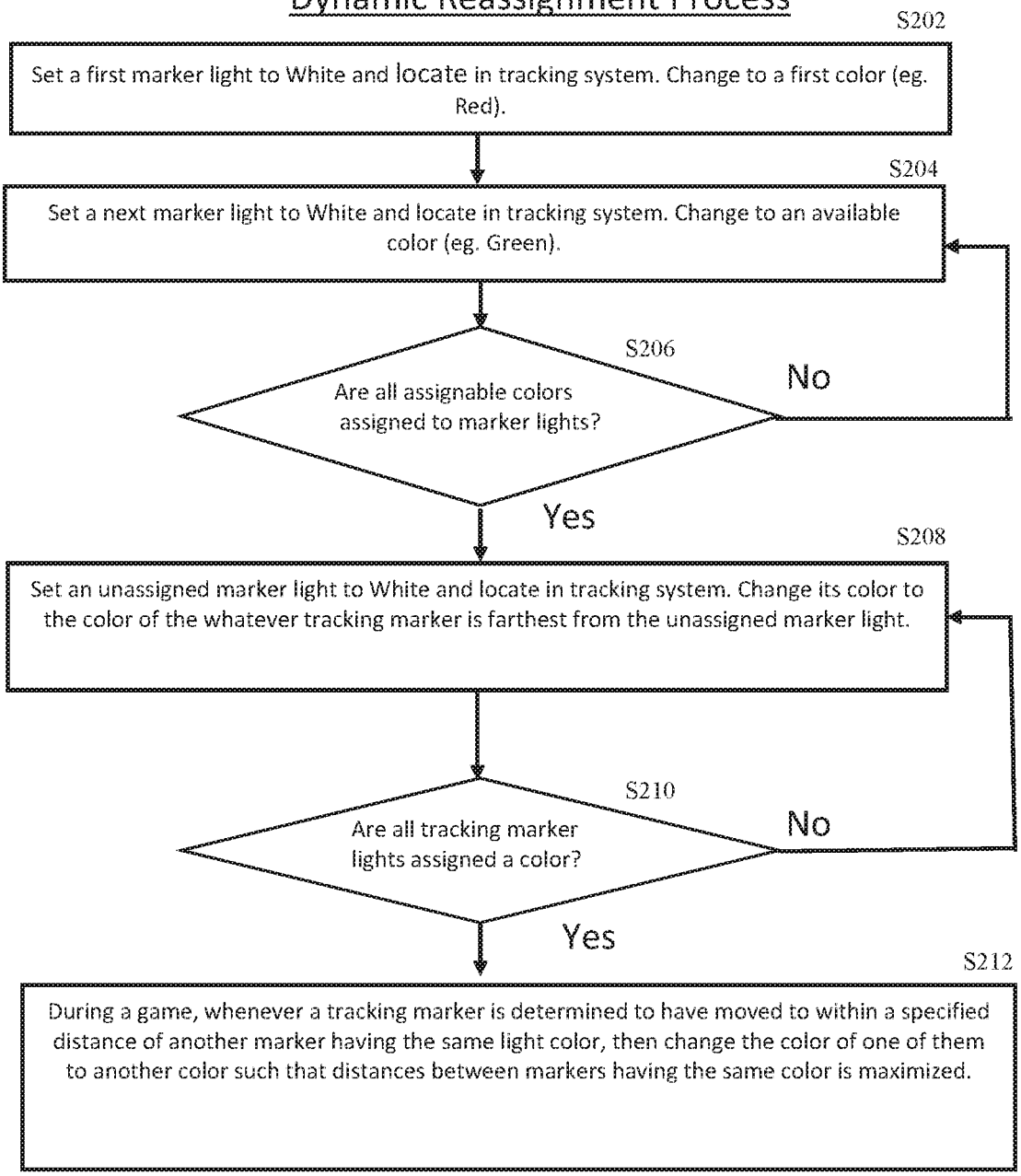
FIG. 2 depicts a flowchart for initial color assignment before play as well as dynamic reassignment of colors during game play in accordance with one embodiment of the invention.

An example process for initial color assignment for the tracking marker lights 108 before play, and for dynamic color reassignment for the marker lights 108 during play, is shown in FIG. 2. In block S202, a first marker light 108 is set to white, then is viewed by one or more cameras 102, and is located in the tracking system of depicted in FIG. 1. The first marker light 108 is then changed to a first color, for example red. Next, in block S204 a next marker light 108 is set to white and located by the tracking system in the same manner as block S202. Subsequently, this next marker light 108 is changed to a different available color, for example green.

In other examples, the tracking marker lights 108 may be other light or radiation sources, including fluorescent light sources, infrared bulbs, or other types of light sources.

At this point, it is determined if all assignable colors have been assigned to marker lights 108 (block S206). If not, block S204 is executed again with a next marker light 108 and changed to a next available color which might be, for example, blue, since red and green have been assigned. If all assignable colors have been assigned to marker lights (block S206), then the process proceeds to block S208. Note that an exemplary list of assignable colors may comprise White (R,G,B), Red (R), Blue (B), Green (G), Yellow (R,G), Cyan (B,G), Magenta (R,B). This list of assignable colors is merely exemplary and color variations in-between the listed available colors are also possible.

In block S208, the process starts assigning colors to new unassigned marker lights 108 where the color has been previously assigned to at least one other marker light 108. As such, the system considers the distance from the new unassigned marker light 108 to the previously assigned marker lights 108 in making a color choice. Per block S208, a next unassigned marker light 108 is set to white and located in the tracking system. Subsequently its color is changed to be the same as whichever tracking marker, previously assigned with a color, is farthest from this next unassigned marker light 108. In block S210 it is determined if all tracking marker lights 108 have been assigned a color. If not, block S208 is repeated until all marker lights 108 have been assigned a color. Otherwise, the process proceeds to cover dynamic color reassignment during operation of a game.

Per block S212, whenever during a game a tracking marker 108 is determined to have moved within a specified minimum distance of another tracking marker 108 having the same light color, the color of one of the two tracking markers is changed to another color such that distances between markers having the same color is maximized. The specified distance may vary based on the size of the game arena. As such, one of the tasks of the server architecture 110 is to keep track of all distances between tracking markers 108 having the same color, and compare those distances with the specified minimum distance.

Figure 3:
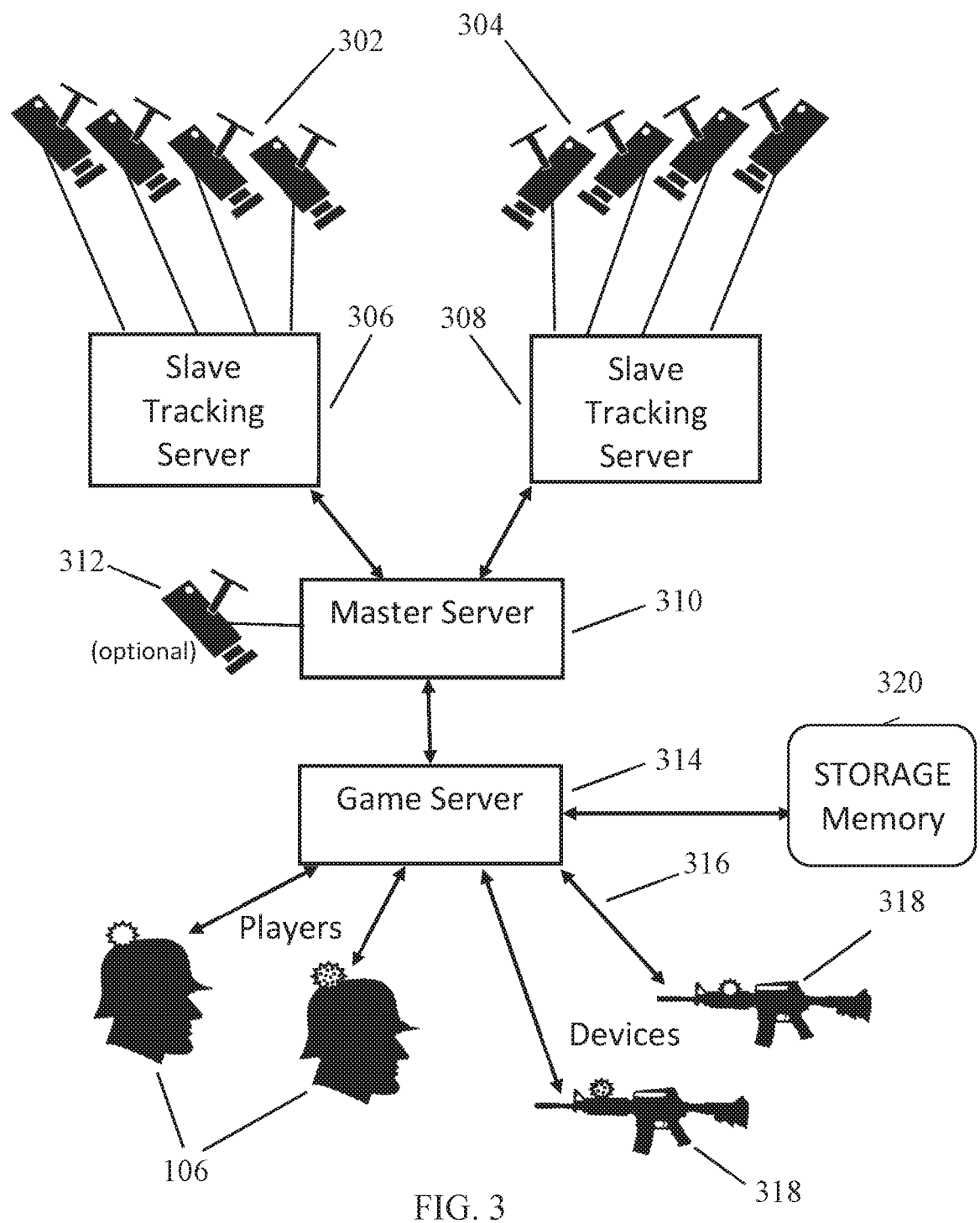
FIG. 3 depicts a system comprising a plurality of cameras, players, and controllers connected to a hierarchical server architecture in accordance with one embodiment of the invention.

FIG. 3 depicts a system comprising a plurality of cameras, players, and controllers connected to a hierarchical server architecture, according to an exemplary embodiment. Here, one bank of color cameras 302 connects with slave tracking server 306, while another bank of color cameras 304 connects with slave tracking server 308. Positions and movements of game objects tracked by slave tracking servers 306 and 308 are consolidated in master server 310 which may optionally have one or more local cameras 312 connected to it. Note that calibration of tracking marker 108 positions may be performed locally on the server(s) observing that tracking marker. The number of slave tracking servers and master server depicted in FIG. 3 is merely exemplary and not limited thereto. Furthermore, the functionality of the slave tracking server and the master tracking server may be combined into a single server, according to an exemplary embodiment.

When a slave tracking server such as 306 or 308 receives an image, they immediately process the image to identify any tracking markers in the optical data of the image. The slave tracking server 308 immediately sends the processed data to the master server 310 and performs no further processing on that particular image, according to an exemplary embodiment. This may include identifying a pixel row and column location of the tracking marker 108, including with a time stamp camera identification.

Master server 310 interfaces with game server 314 which communicates wirelessly 316 with players 106 and other devices 318 which may include for example any of controller devices including simulated weapons, according to one exemplary embodiment. The communication may even be conducted via a wired connection, according to another exemplary embodiment.

The master server 310 collects all the processed data from both local cameras 312 and slave servers 306 and 308. It continues to store all this information until it has a complete set of data from each camera in the system or until it receives repeated data from the same camera. Once the data set is considered complete, it performs the next stage of processing on each individual camera image to create a list of all the intersections of the data points from the cameras where the tracking marker is a match. Positions of these intersection points are then averaged out to create the final processed position for each tracking marker. Where not enough information is available to create an accurate intersection or the information conflicts within a threshold, the information may be optionally discarded.

Once the master server 310 has processed and consolidates all the data of the position of the objects 318 and individuals 106-1 to -n tracked and activities within the VR arena using color markers and color camera groups 302 and 304 received from the plurality of slave tracking servers 306 and 308 with identified and determined the positions of the tracked markers, the consolidated data is processed to identify the position of participating individuals and tracked equipment relative to other participating individuals and tracked equipment, as well as the relative movement of these individuals and trackled equipment to generate the feedback to be provided to the individuals in the arena for continued activity. The consolidated data and the feedback generated are sent to the game server 314. The game/activity server 314 further timestamps the data and feedback as it is received and saves the data and feedback information in a dedicated position and activity information storage memory 320. This is the information that is communicated wirelessly 316 with players 106 and other devices 318 which may include for example any of controller devices including simulated weapons, for continued Game play.

In this exemplary embodiment, the dedicated position and activity information storage memory 320 is shown connected to the game/activity server 314, but alternate embodiments may have the dedicated position and activity information storage memory 320 connected to the Master server 310 with all the payback and review capabilities discussed later in this application remaining intact.

FIG. 4 depicts a flowchart illustrating this process for synchronizing a plurality of cameras with consistent and accurate locations of objects, according to an exemplary embodiment. In block S402, tracking markers in the space are located using cameras 302 and 304 communicating with slave servers 306, 308. In block S404, positions of tracking markers are communicated from the various slave servers 306, 308 to master server 310. In block S406 a process operating on the master server creates a list of all intersection points where a position of a first marker seen by one camera matches a position of a second marker seen by another camera. Then in block S408, for each intersection point in the list of intersection points, the positions of the first and second tracking markers are averaged to create a processed position for that intersection point, and represents a position of a composite tracking marker corresponding to both the first and second tracking markers that will be used thenceforth in operation of the game.

The master server 310 and the slave servers 306,308 are exemplary embodiment forming part of the hierarchy server where the master server 310 may have unidirectional control over the slave servers 306, 308. However, the master and the slave servers may be incorporated into a single server which performs the below defined functions of both the master server 310 and the slave server 306, 308, according to an exemplary embodiment.

Figure 5:
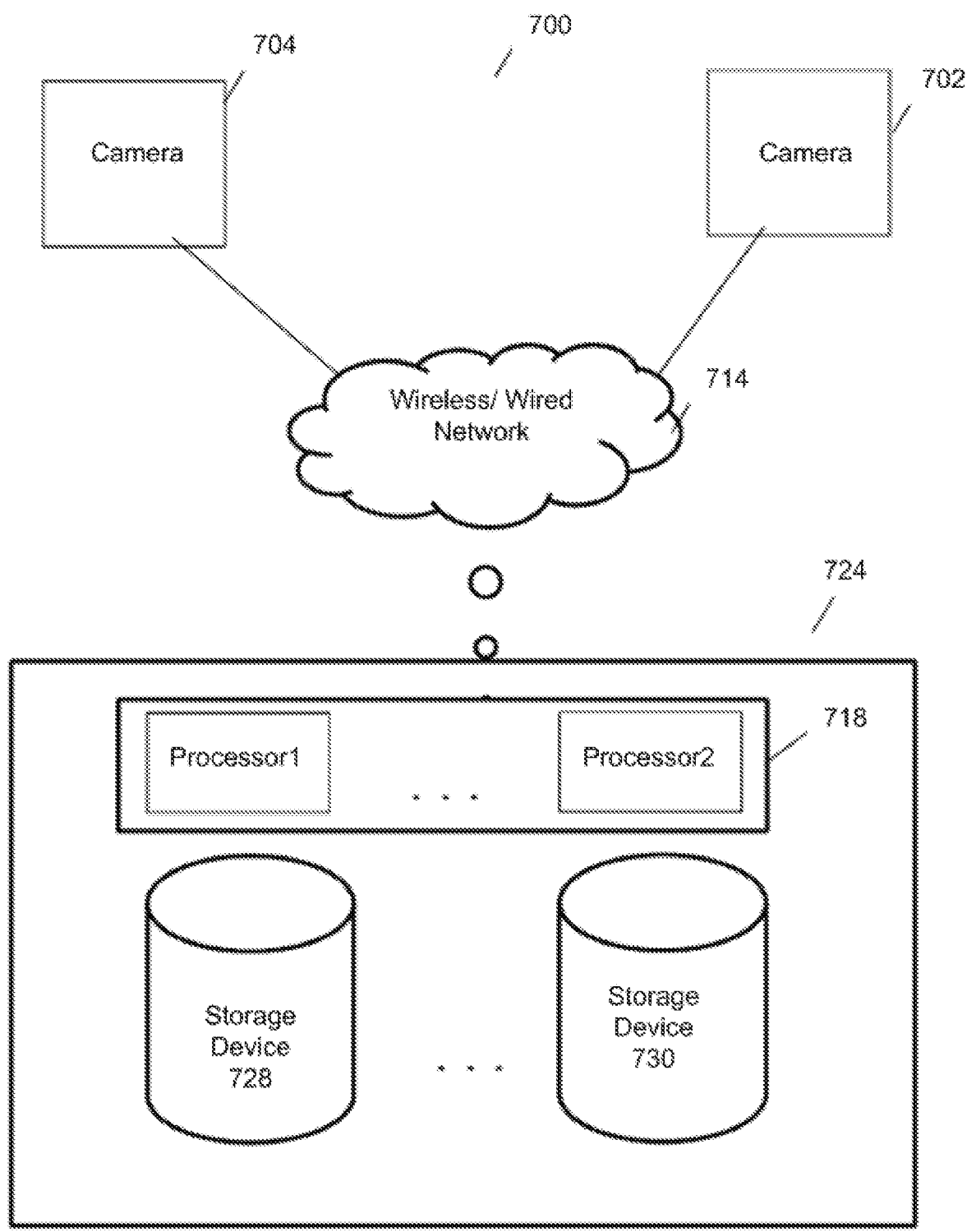
FIG. 5 is a block diagram of a system of a plurality of cameras communicating with a server, for collection of location and activity data in accordance with one embodiment of the invention.

FIG. 5 depicts a block diagram of a gaming system 700, according to another exemplary embodiment. The system 700 includes Cameras 702 and 704 and VR server 724. The cameras, 702 and 704, may be capable of accessing the VR server 724 either directly or indirectly over a network 714. The cameras, 702 and 704, may access the VR server 524 over the network 714 using wireless or wired connections supporting one or more point-to-point links, shared local area networks (LAN), wide area networks (WAN), or other access technologies. These cameras 702 and 704 may be transmitting video, audio or other kinds of data to the VR server 724.

According to the exemplary embodiment depicted in FIG. 5, the VR system 700 is a type of system that provides tracking of marker lights on players or their controllers or other game objects using cameras 702 and 704 using storage devices 728, 730 and multiple processors 718. However, it should be appreciated that alternate embodiments of the VR system 700 may use a single processor and storage device and the depicted embodiment is merely exemplary. Furthermore, although FIG. 5 depicts a single server 724, the VR system may comprise multiple servers splitting up the functionalities which are performed by the depicted server 724, as described in the exemplary embodiment of FIG. 1.

In the exemplary embodiment depicted in FIG. 5, the VR server 24 may receive the location information and other action/state information regarding a user holding a controller, colors assigned to the tracking lights on the controller or other game objects etc. in a space using the cameras 702 and 704. The VR server 724 may be realized as a software program stored in a memory and executing on a central processing unit (CPU).

The VR server 724 may use video images from the tracking cameras 702,704. In some embodiments, the VR server 724 receives video images over video cables connected to the cameras; however, the images may be transferred wirelessly. Possible video cable types include analog formats such as composite video, S-Video and VGA, and digital formats such as HDMI and DVI, however these are mere exemplary embodiments and the possibilities are not limited thereto. In another embodiment, the slave server receives video images over a wireless communication connection.

The VR server 724 may follow the procedures described in FIG. 2 and FIG. 4 for assignment and reassignment of colors to the tracking marker lights, and synchronization of the cameras 702,704.

The present disclosure emulates a real-world experience for players, and as such the experience players have is quite real, just as pilots in flight simulators experience all the aspects of flying a real airplane. The disclosure is deeply intertwined with computer and networking technology without which it would not be possible. In fact, the functions described herein have an extremely time-sensitive nature to their operation in order to achieve a true virtual reality experience, and without an intimate integration with the described hardware would not function properly, if at all.

The dynamic reassignment of colors during a game based on changing distances between light markers having the same color is a function grounded in reality. The use of a physical calibration device to calibrate distances for each camera as well as the process for synchronizing positions among a plurality of cameras, are all concrete functionalities.

Figure 6:
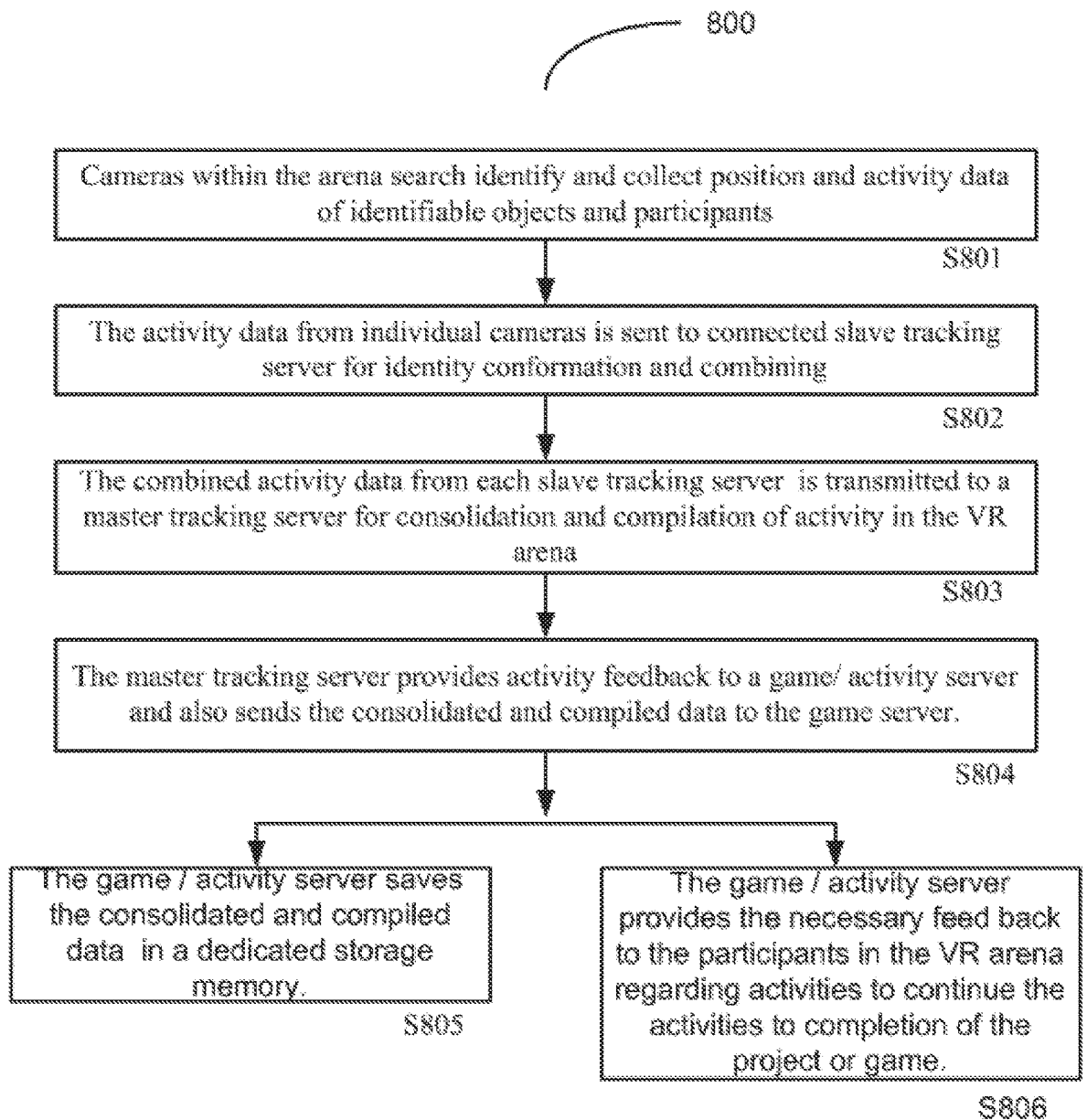
FIG. 6 is a flowchart of an exemplary operation of the plurality of systems for collection, processing and compilation of data for feedback to the participants in the arena and for saving in dedicated memory at the game server in accordance with one embodiment of the invention.

FIG. 6 is an exemplary flowchart 800 of operation of the system for collection, processing and compilation of data for activity review and feedback to the participants in the arena and for saving in dedicated memory at the game server.

The plurality of camera groups 302 and 304 within the arena search for color markers to identify and collect position and activity data of objects and participants within the arena (block S801).

The activity data, from individual cameras of 302 and 304 groups, is sent to connected slave tracking servers 306 and 308 respectively for color based identification of individuals and devices, and for combining of the data (block S802).

The combined location and activity data of individuals and devices, from each of the slave tracking servers 306 and 308, is transmitted to a master tracking server 310 which may also have cameras 312 connected to it for consolidation and compilation of position and activity in the VR arena (block S803).

The master tracking server 310 processes the data collected and provides activity feedback to a game/activity server 314 to be passed to the individuals in the arena and the master server 310 also sends the consolidated and compiled data with the feedback to the game/activity server 314 (block S804).

The game/activity server 314 saves the consolidated and compiled data and feedback information received from the master server 310 in a dedicated position and activity information storage memory 320 (block S805).

The game/activity server 314 further provides the necessary feedback to the individual participants 106-1 to 106-n, in the VR arena regarding positions and activities of other participants within the VR arena to continue the activities to completion of the project or game (block S806).

At times an individual is made inactive within the VR arena due to a simulated death in game play or negative/failed activity during a project. The system provides the individual with the capability to review his actions and the actions of others around him within the VR arena for a short period prior to the resul, to determine and study what contributed to the result. This is an important learning tool for instantaneous review leading to learning that enhances the value of the system, enabling identification of activities leading to any adverse result for a participating individual.

Figure 7:
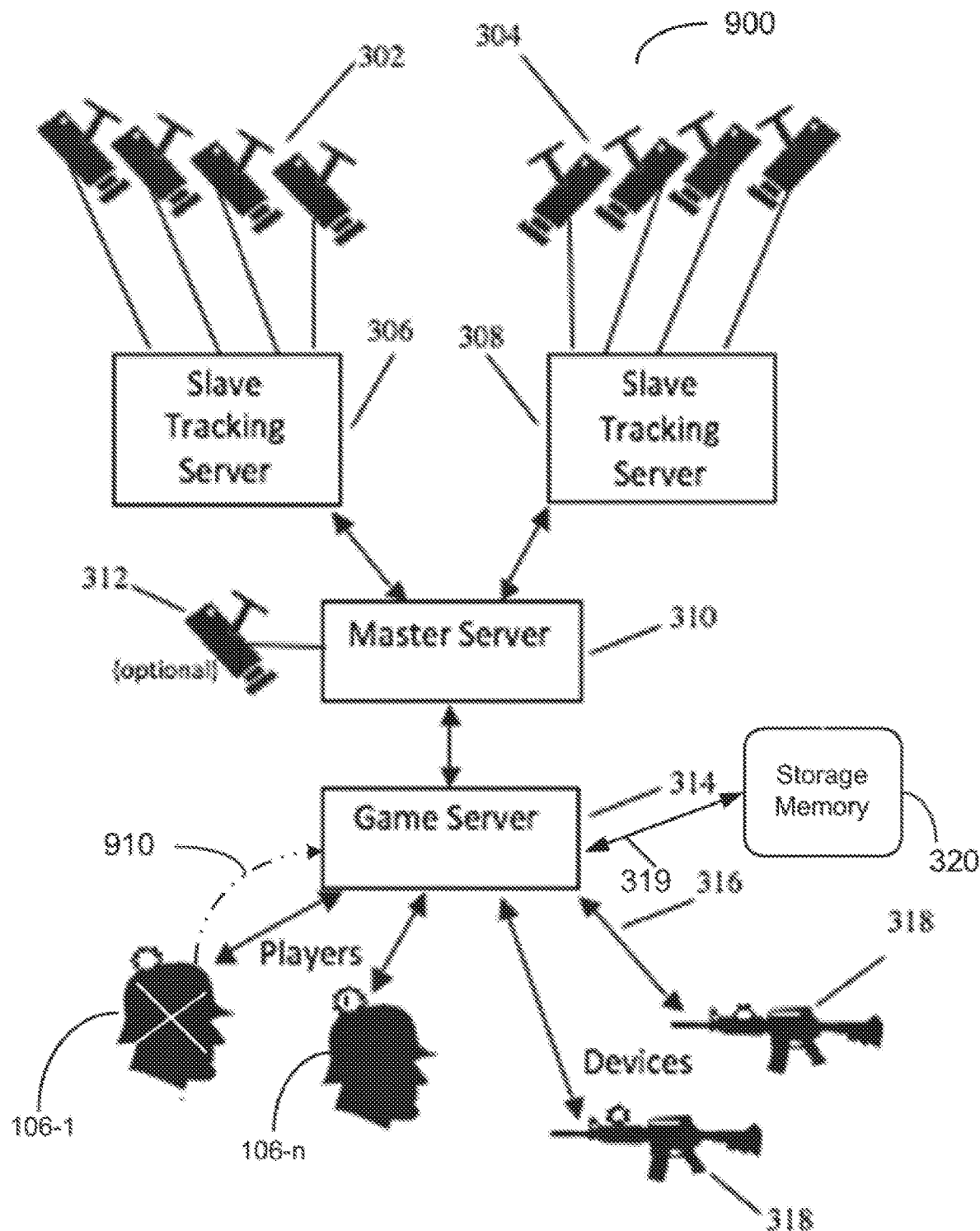
FIG. 7 shows an exemplary system for handling a replay request from a non-active participant within the arena in accordance with one embodiment of the invention.

FIG. 7 is an embodiment of the system block diagram 900, with the above capability to provide review feedback on request to inactive individuals within the VR arena.

In the exemplary instance shown in FIG. 7, the individual 106-1 is temporarily made inactive during the activity in the VR arena. He 106-1, is able to request 910 to the game server 314 for a replay of the data on locations and activity immediately prior to and leading to him becoming inactive. This review will allow him, while inactive in the VR arena to view the replay and review the actions of all the participants in the arena for a defined period of time, to understand the actions and responses that occurred within the VR arena during that period. This immediate replay capability provides a valuable learning tool to understand and correct any identifiable errors as soon as they impact the individual concerned.

Figure 8:
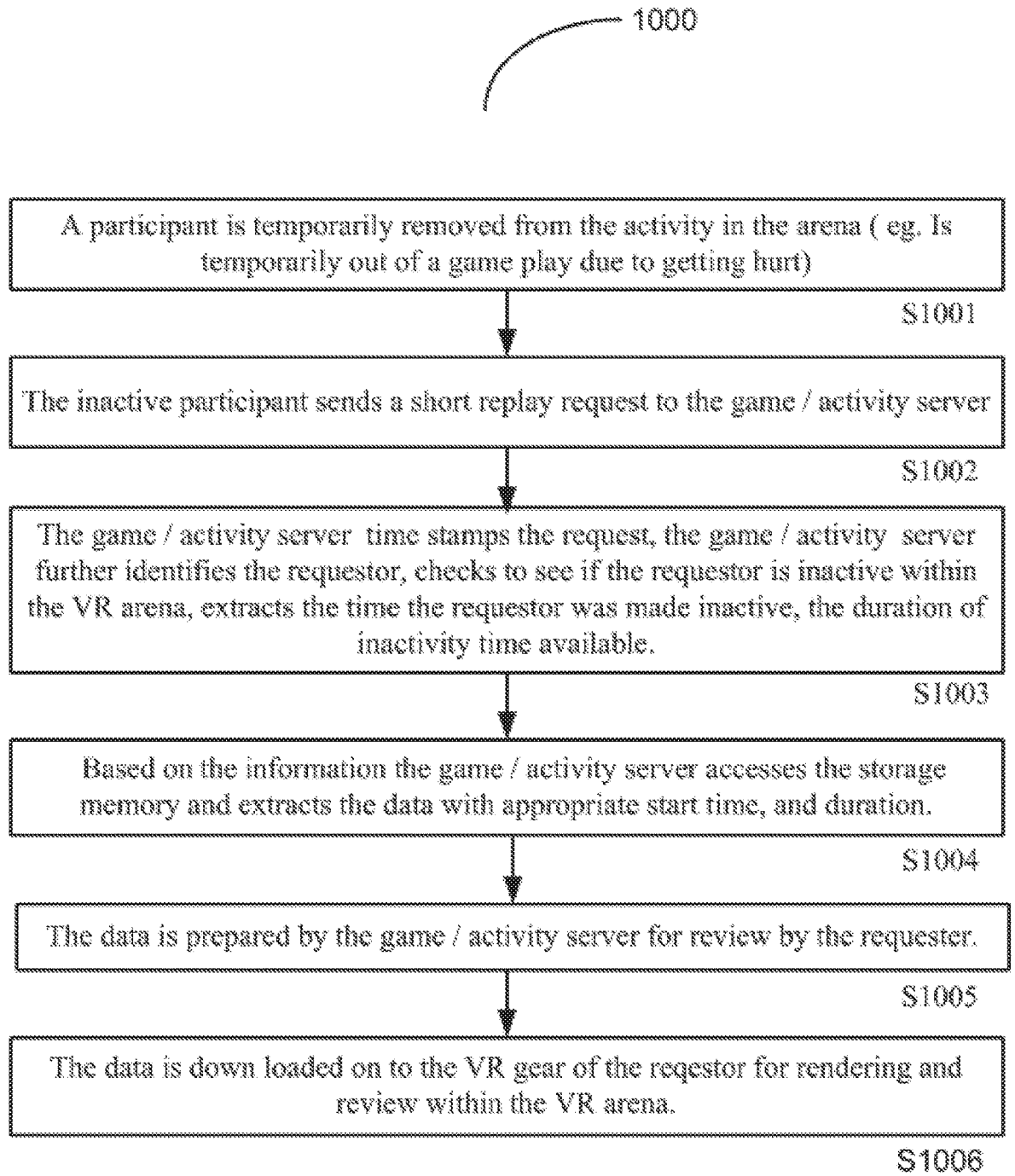
FIG. 8 is a flowchart for an exemplary process for handling a replay request from a non-active participant within the arena in accordance with one embodiment of the invention.

FIG. 8 shows the exemplary flowchart 1000 of such a feedback review activity, enabling the individual to review actions taken within the arena leading to the typically unacceptable result.

A participant 106-1 is temporarily removed from the activity in the arena (e.g. is temporarily out of a game play or project due to negative result of activity within the VR arena) (block S1001). Depending on the activity taking place the individual will typically remain inactive for some period of time that has been pre-defined.

The inactive participant 106-1 is now enabled to sends a short replay request 910 to the game/activity server 314 via his connected communication link (block S1002).

The game/activity server 314 time stamps the request, and confirms the identity of the requesting participant 106-1 (block S1003). The game/activity server 314 also checks the received and saved data, saved in the dedicated position and activity information storage memory 320, to make sure that the requestor is inactive within the VR arena (block S1003). The game/activity server further extracts the time the requesting participant 106-1 was made inactive, the duration of inactivity time available (block S1003).

Based on the information the game/activity server 314 accesses the dedicated position and activity information storage memory 320 and extracts the data with appropriate start time, and available duration (block S1004).

The data extracted is prepared by the game/activity server 314 for review and replay (block S1005).

The data is downloaded on to the VR gear of the requesting participant 106-1 for rendering and review by him while he is inactive within the VR arena (block S1006).

Figure 9:
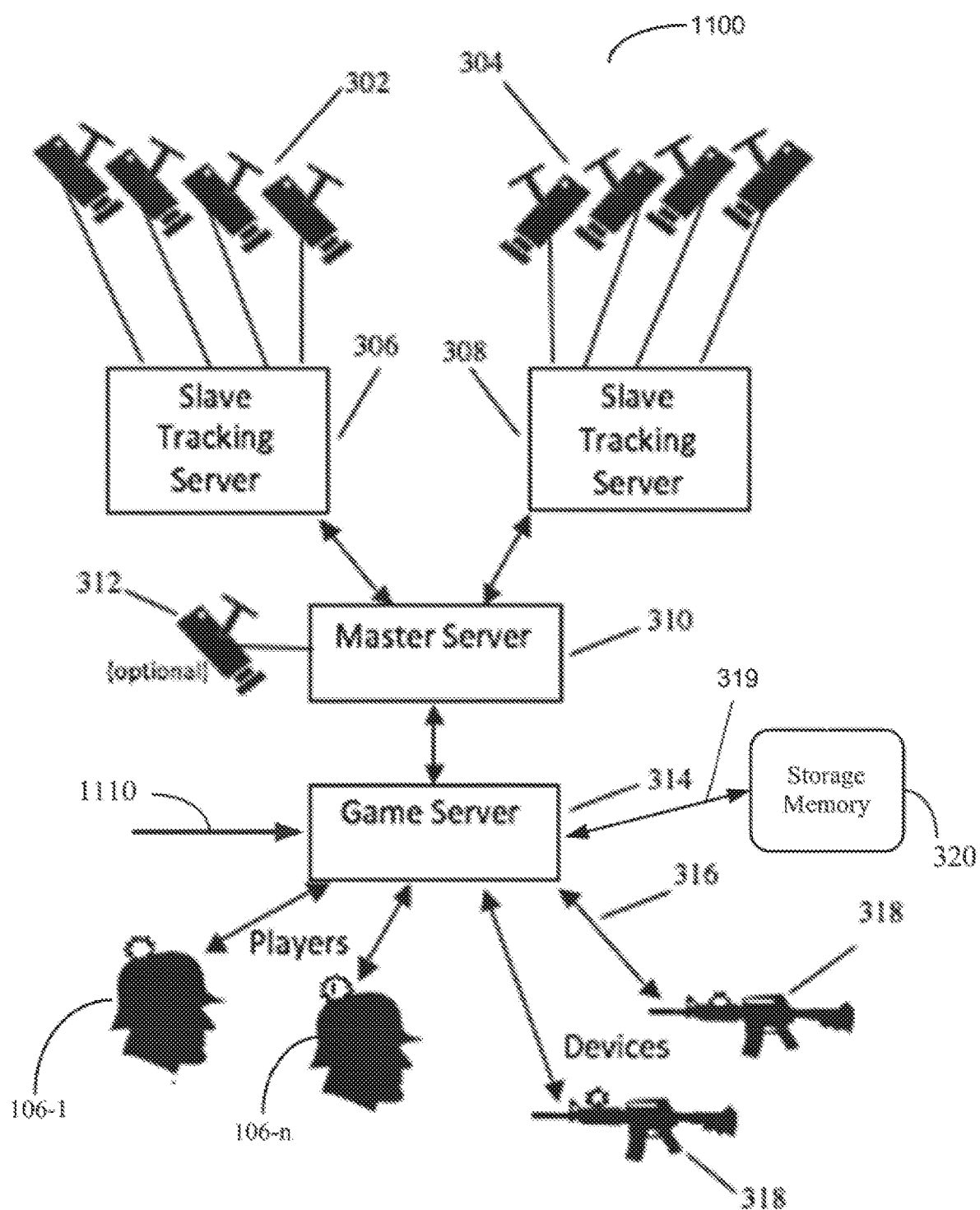
FIG. 9 is a system block diagram for handling a review replay request from an authorized entity outside the arena in accordance with one embodiment of the invention.

When activities within the VR arena is paused, or complete it is possible for a full or partial supervisory replay request to be entertained for review of the activity within the VR arena. FIG. 9 is a block diagram 1100 showing such a request 1110, being input to the VR system, typically to the game/activity server 314, from outside when the system activity is complete or paused. The request may specify a complete to current time replay or a time span replay as required. The supervisory request may be originated from within the VR arena or from outside the VR arena. The replay in both such cases is typically made available for all participants within the arena as well as the supervisory staff, if they are outside the arena or alternately to the supervisory staff alone on any designated server connected for review of activity. Such replay and review capability of total period or specific periods of activity or game play can be used for training purpose to identify problems with actions taken and to provide corrective feedback.

Figure 10:
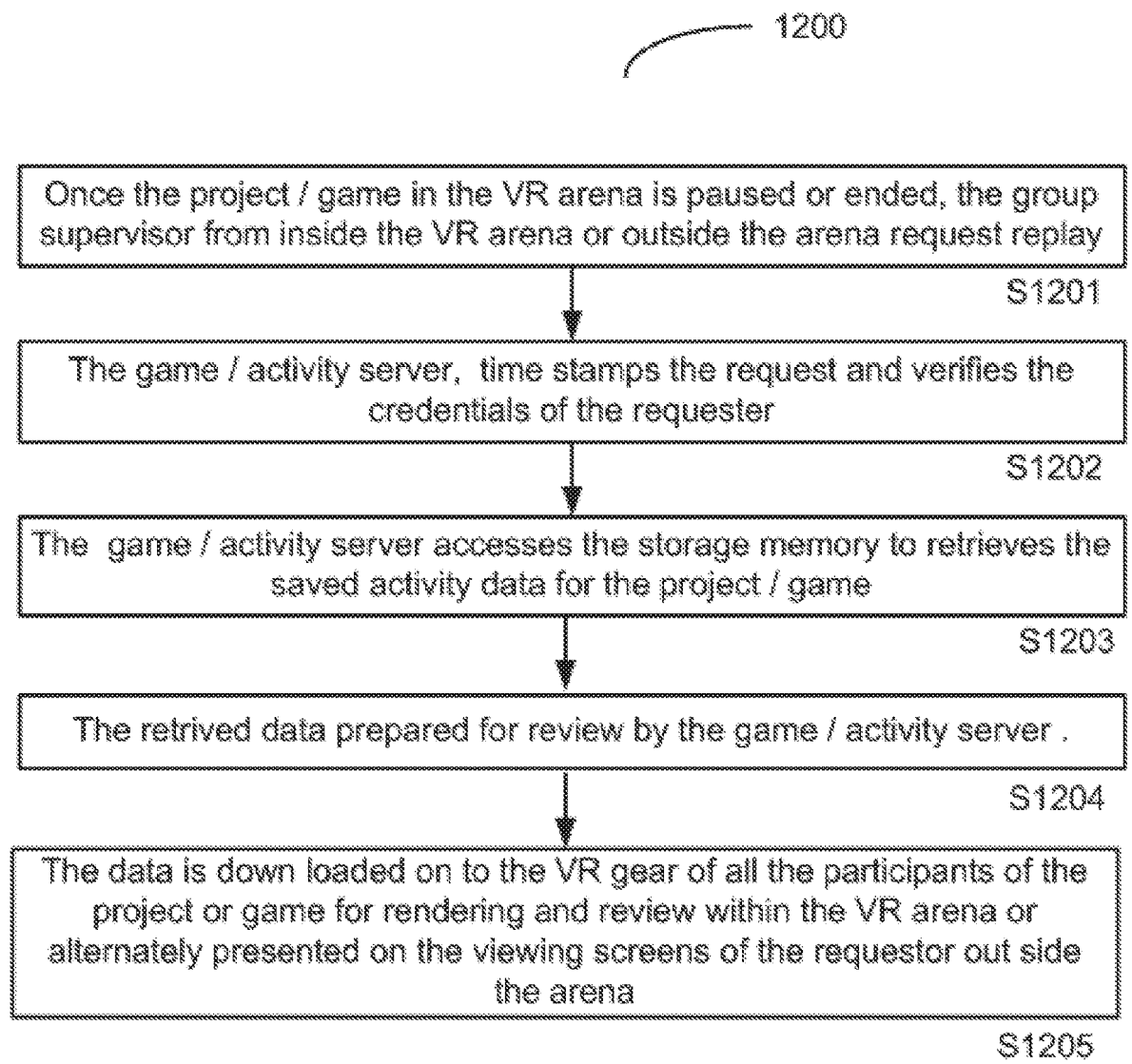
FIG. 10 is a flowchart for an exemplary process for handling a review replay request from an authorized entity outside the arena in accordance with one embodiment of the invention.

The FIG. 10 is an exemplary flow chart 1200 of such a supervisory review and feedback activity.

Once the project/game activity in the VR arena is paused or ended, a group supervisor from inside the VR arena or from outside the arena requests replay of the activity 1110 (FIG. 9) (block S1201). The request goes to the game/activity server 314. This request can be for a specific time segment or for total time when the participants were active in the VR arena.

The game/activity server 314, time stamps the request and verifies the credentials of the requester to make sure it is a valid request (block S1202).

The game/activity server 314 accesses the dedicated position and activity information storage memory 320 to retrieves the saved activity data for the project/game for he required time (block S1203).

The retrieved data prepared by the game/activity server 314 for review and replay either by all participants 106-1 to 106-n within the arena and the supervisory staff, or to be sent to the designated server designated in the request 1110 as required (block S1204).

The data is down loaded by the game/activity server 314 on to the VR gear of all the participants of the project or game for rendering and review within the VR arena or alternately presented on the viewing screens of the requestor outside the arena for review a feedback on the activities (block S1205).

The present disclosure emulates a real-world experience for participants, and as such the experience participants have is quite real, just as pilots in flight simulators experience all the aspects of flying a real airplane. The disclosure is deeply intertwined with computer and networking technology without which it would not be possible. In fact, the functions described herein have an extremely time-sensitive nature to their operation in order to achieve a true VR or AR experience, and without an intimate integration with the described hardware would not function properly, if at all.

The embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture.

Preferably, the servers are implemented on a computer platform having hardware such as one or more central processing units ("CPUs"), one or more memories, and one or more input/output interfaces. The computer platform may also include an operating system and micro-instruction code. The various processes and functions described herein may be either part of the micro-instruction code or part of the application program, or any combination thereof, which may be executed by a CPU, whether or not such computer or processor is explicitly shown. In addition, various other peripheral units may be connected to the computer platform such as an additional data storage unit and a printing unit.

Although a number of possible implementations have been mentioned, these are presented merely for the sake of explanation and teaching, and are not limitative. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the claims that follow.

What is claimed is:

1. A system for operating a virtual reality environment in a virtual reality arena comprising:
a master server;
a plurality of slave tracking servers in communication with and controlled by the master server;
a game server communicatively coupled to the master server;
a plurality of color cameras communicatively coupled to each of the plurality of slave tracking servers and configured to capture an image of at least one space used in the virtual interactive scenario experience and a plurality of objects within the space;
a mobile controller communicatively coupled to the game server and associated with the individual participant and an equipment device in the virtual reality environment;
a plurality of colored-light emitting tracking devices, each of the plurality of colored-light emitting tracking devices attached to each of the plurality of objects, wherein the plurality color cameras are configured to track the plurality of colored-light emitting tracking devices in the virtual reality environment;
wherein the game server is configured to provide feedback to the mobile controller associated with the individual participant,
wherein the plurality of colored-light emitting tracking devices uniquely identify each of the plurality objects tracked by the plurality of color cameras, the plurality of tracked objects comprising different individual participants and different equipment participating in the virtual interactive scenario experience in the virtual reality environment in the virtual reality arena,
wherein the plurality of color cameras is configured to track positions of the plurality of colored-light emitting tracking devices attached to each of the plurality of objects,
wherein each of the plurality of slave tracking servers is configured to determine optical tracking data and analyze the optical tracking data to identify the plurality of colored-light emitting tracking devices attached to each of the plurality of objects,
wherein the master server receives the optical tracking data from the plurality of slave tracking servers and wherein the master server is configured to determine position and activity data, wherein position and activity data comprises positions and activities of the plurality of objects tracked by the plurality of color cameras in the virtual reality environment within the virtual reality arena,
wherein the master server is further configured to send the determined position and activity data to the game server, and
wherein the game server is further configured to change a color of at least one of the plurality of colored-light emitting tracking devices if the at least one of the plurality of colored-light emitting tracking devices is within a predefined distance of another one of the plurality of colored-light emitting tracking devices assigned the same color within the virtual reality environment; and
a storage system coupled to the game server for storing the position and activity data received from the master server,
wherein the game server is configured to provide real-time feedback information to the mobile controller associated with the individual participant based on the position and activity data,
wherein the game server is further configured to retrieve and play back a segment of the stored position and activity data that relate to a time period just prior to a temporarily inactive individual participant within the virtual reality arena through a wireless communication link in response to receiving a request from within the virtual reality arena from the temporarily inactive individual participant,
wherein the game server is further configured to receive a request to provide a play back of the activity of the individual participant and equipment in the virtual environment based on the stored position and activity data.

2. The system of claim 1, further comprising a backpack personal computer electronically coupled to at least one of a head-mounted device, the mobile controller or the equipment carried by the individual participant.

3. The system of claim 1, wherein the plurality of colored-light emitting tracking devices are selected from the group consisting of fluorescent light sources and infrared bulbs.

4. The system of claim 1, wherein each of the plurality colored-light emitting tracking devices is configured to display multiple colors.

5. The system of claim 1, wherein the play back is for activity review within the virtual reality arena solely by the temporarily inactive individual participant requesting the play back, while the individual participant is in the inactive state and while the activity in the virtual reality arena is continuing.

6. The system of claim 1, wherein the play back is for training.

7. A system for replay of activities in a virtual interactive scenario experience presented in the virtual reality environment within a virtual reality arena, the system comprising:
a master server;
a plurality of slave tracking servers in communication with and controlled by the master server;
a game server communicatively coupled to the master server;
a plurality of color cameras communicatively coupled to each of the plurality of slave tracking servers, wherein the plurality of color cameras are configured to observe a plurality of colored-light emitting tracking devices attached to a plurality of objects, wherein the plurality of color cameras are configured to track the plurality of colored-light emitting tracking devices in the virtual reality environment,
wherein the tracked positions of the plurality of colored-light emitting tracking devices are processed by at least one of the plurality of slave tracking servers to determine optical tracking data, wherein each of the plurality of slave tracking servers is configured to analyze the optical tracking data to identify the plurality of colored-light emitting tracking devices, wherein the master server receives the optical tracking data from the plurality of slave tracking servers, wherein the master server is configured to determine position and activity data, wherein position and activity data comprises positions and activities of the plurality of objects tracked by the plurality of color cameras in the virtual reality environment within the virtual reality arena, wherein the master server further provides the determined position and activity data to the game server, and wherein the game server is further configured to change a color of at least one of the plurality of colored-light emitting tracking devices if the at least one of the plurality of colored-light emitting tracking devices is within a predefined distance of another one of the plurality of colored-light emitting tracking devices assigned the same color within the virtual reality environment; and a storage system coupled to the game server for storing the position and activity data received from the master server, wherein the game server is configured to provide real-time feedback information to a mobile controller associated with an individual participant based on the position and activity data, and wherein the game server is also configured to retrieve and play back the stored position and activity data within the virtual interactive scenario experience presented in the virtual reality environment for a requested time period in response to receiving a request from an authorized individual participant during an inactive state of the authorized individual participant.

8. The system of claim 7, wherein the authorized individual is within the virtual reality arena during the inactive state.

9. The system of claim 7, wherein the authorized individual is outside the virtual reality arena during the inactive state.

10. The system of claim 7, wherein the stored position and activity data is played back through a wireless communication link to the individual participants solely within the arena when the individual participant is temporarily inactive within the virtual interactive scenario experience and when other participants are active within the virtual interactive virtual scenario experience presented in the virtual reality environment within the virtual reality arena.

11. The system of claim 7, wherein the stored position and activity data within the virtual interactive scenario experience presented in the virtual reality environment is played back through a communication link to the authorized individual participant.

12. The system of claim 7, wherein the inactive state comprises a temporary break in the virtual interactive scenario experience activity in the virtual reality environment.

13. The system of claim 7, wherein the inactive state comprises completion of the virtual interactive scenario experience activity in the virtual reality environment.

14. The system of claim 7, wherein the play back is available to all individual participants in the virtual interactive scenario experience in the virtual reality environment.

15. The system of claim 7, wherein the play back is available outside the virtual reality environment.

16. A system comprising:

a processor;

a memory coupled to the processor, the memory containing a machine readable medium comprising machine executable code having stored thereon instructions for operating the system, wherein the system is configured to execute the machine executable code to cause the system to:

assign a specific color selected from a plurality of distinct colors to each one of a plurality of colored-light emitting tracking devices, the plurality of colored-light emitting tracking devices attached to a plurality of objects;

identify the plurality of objects in a virtual reality environment in a virtual reality arena by tracking the position of the plurality of colored-light emitting tracking devices using a plurality of color cameras, wherein the plurality of objects includes an individual participant, a mobile controller communicatively coupled to a game server and associated with the individual participant, and an equipment device in the virtual reality environment;

change the specific color assigned to at least one of the plurality of colored-light emitting tracking devices if the at least one of the plurality of colored-light emitting tracking devices is within a predefined distance of another one of the plurality of colored-light emitting tracking devices assigned the same specific color within the virtual reality environment;

determine optical tracking data based on the tracked positions of the plurality colored-light emitting tracking devices, wherein the optical tracking data is analyzed to determine position and activity data of the plurality of objects and to provide real-time feedback information to the mobile controller associated with the individual participant based on the position and activity data;

receive a request to provide a play back of the activity of the individual participant and equipment in the virtual environment based on the stored position and activity data;

extract data responsive to the replay request to provide the play back of the activity of the individual participant and equipment in the virtual environment, the extracted data including the position and activity data collected for the identified plurality of objects; and transmit the extracted data to an authorized requestor.

17. The system of claim 16, wherein the replay request is received from at least one of the participants in the virtual reality environment, and wherein the data corresponding to the replay request is transmitted to the at least one of the participants that requested the replay.

18. The system of claim 16, wherein the replay request is received from an administrator of the virtual reality environment, and wherein the data corresponding to the replay request is transmitted to all participants in the virtual reality environment.

19. A computerized method comprising:

assigning a specific color selected from a plurality of distinct colors to each of a plurality of colored-light emitting tracking devices attached to a plurality of objects;

identifying the plurality objects in a virtual reality environment within a virtual reality arena by tracking the position of the plurality of colored-light emitting tracking devices using a plurality of color cameras, wherein the plurality of objects includes an individual participant, a mobile controller communicatively coupled to a game server and associated with the individual participant, and an equipment device in the virtual reality environment;

changing the specific color assigned to at least one of the plurality of colored-light emitting tracking devices if the at least one of the plurality of colored-light emitting tracking devices is within a predefined distance of another one of the plurality of colored-light emitting tracking devices assigned the same specific color within the virtual reality environment;

determining optical tracking data and analyzing the optical tracking data to identify the plurality of colored-light emitting tracking devices to determine position and activity data for the identified plurality of objects and transmitting the optical tracking data to a master server, receiving the optical tracking data from plurality of slave tracking servers;

determining position and activity data, wherein position and activity data comprises positions and activities of the plurality of objects tracked by the plurality of color cameras in the virtual reality environment within the virtual reality arena;

sending the position and activity data to a game server for providing real-time feedback information to the mobile controller associated with the individual participant based on the position and activity data;

storing the position and activity data in memory;

receiving a request to provide a play back of the activity of the individual participant and equipment in the virtual environment based on the stored position and activity data;

extracting data responsive to the replay request to provide the play back of the activity of the individual participant and equipment in the virtual environment, the extracted data including the position and activity data collected for the identified plurality of objects; and transmitting the extracted data to an authorized requestor.

20. The computerized method of claim 19, wherein the replay request is received from at least one of the participants in the virtual reality environment, and wherein the data corresponding to the replay request is transmitted to the at least one of the participants that requested the replay.

21. The computerized method of claim 19, wherein the replay request is received from an administrator of the virtual reality environment, and wherein the data corresponding to the replay request is transmitted to all participants in the virtual reality environment.

22. The system of claim 1, wherein the system is configured to present a plurality of virtual interactive scenario experiences in a plurality of virtual reality environments within the virtual reality arena.

23. The system of claim 22, wherein the master server compiles and processes data regarding the plurality of virtual interactive scenario experiences.

24. The system of claim 7, wherein the master server determines position and activity of individual participants and equipment in a plurality of virtual interactive scenario experiences in a plurality of virtual reality environments within the virtual reality arena.

25. The system of claim 16, wherein the processor is further configured to identify the plurality of objects in a plurality of virtual reality environments supported within the virtual reality arena.

26. The computerized method of claim 19, further comprising identifying the plurality of objects in a plurality of virtual reality environments supported within the virtual reality arena.

27. The system of claim 1, wherein the plurality of colored-light emitting tracking devices comprises a marker illumination device.

28. The system of claim 1, wherein the virtual reality arena is a free roaming arena configured to provide the virtual interactive scenario experience as a three-dimensional experience to the individual participants.

* * * * *